(12) United States Patent
Zhao

(10) Patent No.: US 8,433,806 B2
(45) Date of Patent: Apr. 30, 2013

(54) METHOD FOR REFUSAL OF 1X PAGE DELIVERY IN A HIGH RATE PACKET DATA SYSTEM

(75) Inventor: Xiaowu Zhao, Shenzhen (CN)

(73) Assignee: ZTE Corporation, Shenzhen Guangdong Province (CN)

( * ) Notice: Subject to any disclaimer, the term of this patent is extended or adjusted under 35 U.S.C. 154(b) by 891 days.

(21) Appl. No.: 12/522,370

(22) PCT Filed: Dec. 21, 2007

(86) PCT No.: PCT/CN2007/003716
§ 371 (c)(1),
(2), (4) Date: Jul. 7, 2009

(87) PCT Pub. No.: WO2008/086696
PCT Pub. Date: Jul. 24, 2008

(65) Prior Publication Data
US 2010/0049789 A1  Feb. 25, 2010

(30) Foreign Application Priority Data
Jan. 8, 2007 (CN) .......................... 2007 1 0072835

(51) Int. Cl.
*G06F 15/16* (2006.01)

(52) U.S. Cl.
USPC ..................................... 709/227; 709/225

(58) Field of Classification Search .................. 709/225, 709/227
See application file for complete search history.

(56) References Cited

U.S. PATENT DOCUMENTS 7,796,582 B2 * 9/2010 Mandayam et al. .......... 370/352
8,055,280 B2 * 11/2011 Liu ............................... 455/458

FOREIGN PATENT DOCUMENTS

| CN | 1849001 A | 10/2006 |
| CN | 1933655 A | 3/2007 |
| CN | 1937807 A | 3/2007 |
| CN | 1941996 A | 4/2007 |

OTHER PUBLICATIONS

3GPP2; "Interoperability Specification for High Rate Packet Data Radio Access Network Interfaces with Session Control in the Access Network"; Apr. 2007; 3rd Generation Partnership Project 2; 3GPP2 A.S0008-A v2.0; pp. 1-256.*

* cited by examiner

*Primary Examiner* — Jeffrey Nickerson
(74) *Attorney, Agent, or Firm* — Workman Nydegger

(57) ABSTRACT

A method for rejecting the 1× paging transferred in the High Rate Packet Data network is provided, in which the Secondary Color Code mechanism is applied so that the AN which a MS/AT registers transmits A13-paging request messages to the other neighboring ANs, these ANs page a cell phone together and some new messages are added to improve the rejection flow. When the SC/MM is in the AN of HRPD system, for the MS/AT on the multiple edges of AN, the invention can be ensured that the MS/AT in the idle or dormant state can effectively receive the service paging from 1× network in the multiple edge regions of AN in HRPD and can reject the 1× service according to selection of users, which ensures the ability of dual network operation.

8 Claims, 2 Drawing Sheets

METHOD FOR REFUSAL OF 1X PAGE DELIVERY IN A HIGH RATE PACKET DATA SYSTEM

TECHNICAL FIELD

The present invention relates to interoperation between High Rate Packet Data network (HRPD) and the CDMA2000 1× (single carrier) network in the communication field, and particularly relates to a method for rejecting 1× service after a user receives a paging from 1× network terminated by a cell phone and transferred in the HRPD system in the overlapped coverage of both HRPD and cdma2000 1× networks when SC/MM (Session Control/Mobility Management) is in the AN (Access Network) of HRPD.

BACKGROUND OF THE INVENTION

At present, following methods are used in the prior art for interoperation between HRPD network and 1× network, and especially for rejecting 1× service after a user receives a paging from 1× network terminated by a cell phone and transferred in the HRPD system:

When IWS (Interworking Solution) is located in AN, the call flow is illustrated as shown in FIG. 1:

101, when MSC (switch of 1× network, Mobile Switching Center) detects a voice call of MS/AT (dual mode terminal) within its service area. The MSC sends paging request message to HRPD AN (Access Network of HRPD system) and one or more 1× BSs (base station of 1× network) reachable for MS/AT in the paging area of AN. MSC starts a timer T3113 for each paging request message.

MSC may contain the caller's information. Wherein, a paging request message may contain a Virtual Page Indicator (VPI) identifying that the 1× BS shall prepare to receive a page response message from the MS/AT.

102, HRPD AN sends a general paging message (GPM) to MS/AT. If caller information is included in MSC in step 101, the caller information contained together in FN (Feature Notification) message is sent to the MS/AT.

103, MS/AT decides not to accept the 1× service and sends a release order to AN.

104, AN sends a rejection message to MSC, indicating the 1× service is rejected. MSC stops all timers T3113 for the MS/AT.

When IWS is located in 1× BS, the call flow is illustrated as shown in FIG. 2:

201, The MSC determines that an incoming call terminates to an MS/AT within its serving region. The MSC sends a Paging Request message to the 1× IWS-BS and starts timers T3113. MSC may optionally include calling party information in this message;

202, IWS-1× BS sends an A21-1× Air Interface Signaling message including a 1× paging message to AN of HRPD and starts a timer Tack-21. If the MSC included calling party information, the calling party information is included in FN message. Before requiring HRPD to page MS/AT, IWS-1× BS guarantees resources supporting the 1× service available;

203, HRPD AN sends a 1× paging message to MS/AT;

204, MS/AT confirms receipt of the 1× paging message;

205, HRPD AN sends an A21 interface acknowledgment (A21-Ack) message to IWS-1× BS to confirm receipt of A21 message. IWS-1× BS stops the timer Tack-21. If HRPD AN fails to detect AT/MS, cause value "Unknown MS/AT" is included in the A21-Ack message and the call flow is finished.

206, MS/AT decides not to accept the 1× service and sends a release order to AN;

207, AN sends A21 interface air interface signaling message including a release order message to 1× BS and starts timer Tack-21;

208, 1× BS sends A21 interface acknowledgment message to AN;

209, 1× BS sends a rejection message to MSC, indicating the 1× service is rejected. MSC stops all timers T3113 for the MS/AT;

210, when a cell phone is in idle state, AN sends an A21 interface event notifying message to BS to remind that MS/AT may be in dormant state. AN starts timer Tack-21;

211, BS sends an A21 interface acknowledgment message to AN. After receiving the acknowledgment, AN stops timer Tack-21.

The above call flows describe how to send a 1× voice paging from the 1× system to a dual mode terminal via the air interface of the HRPD system when MS/AT is in the HRPD system, the user decides not to accept the 1× service and feedback a rejection message to 1× MSC.

However, for AN edge where MS/AT in idle or dormant state is located, there may be other ANs of HRPD. With the movement of MS/AT at the edge, the so called ping-pong effect that registers repeatedly may occur among different ANs. To effectively restrain and reduce ping-pong effect, improve paging mechanisms of different multiple AN edge areas and increase the rate of successful paging to MS/AT, the air interface of HRPD in the prior art defines a Secondary Color Code mechanism, guaranteeing that an AN is able to page MS/AT in other AN service areas. This technology has been applied in the packet data service originated by HRPD network. However, in the present access network technologies, the technology has not yet been applied to transfer the voice service paging from 1× in HRPD network, especially in the condition that the voice service paging from 1× is transferred in HRPD network and a cell phone user rejects the 1× service, when MS/AT is in the multiple edge regions of AN in HRPD.

SUMMARY OF THE INVENTION

The technical problem to be solved by the present invention is to guarantee that MS/AT in the idle or dormant state can effectively receive a service paging from 1× network in multiple edge regions of AN in HRPD and reject the 1× service according to user's selection, during transfer of a voice paging service from 1× in HRPD system, to improve the interoperation between HRPD network and 1× network.

According to one aspect of the present invention, provides a method for rejecting 1× paging transferred in HRPD, when IWS is carried out in AN of HRPD, the method comprises the following steps:

a, sending a paging request message to AN of HRPD by means of MSC of 1× network, i.e. a source AN and one or more 1× BSs reachable for MS/AT in the paging area of the source Access Network;

b, sending an A13-paging request message to a target AN and receiving an A13-paging response message returned by the target AN by means of the source AN;

c, sending general paging messages to the MS/AT respectively by means of the source AN and the target AN;

d, sending a release order to the target AN by means of the MS/AT, and then forwarding the message to the source AN via an A13 air interface message and receiveing an acknowledgment message returned by the source AN by means of the target AN; and e, sending a rejection message to MSC to indicate that the 1× service is rejected by means of the source AN.

Preferably, the source AN is an AN registered by MS/AT in HRPD system, and updated for registration in MSC and connected with MSC. The target AN is other AN on the edge of the source AN.

Preferably, the step c also comprises: if the paging message of the source AN reaches the MS/AT, the MS/AT sends a release order to the source AN and turns to the step e.

Preferably, in the step b, the A13-paging request message can also be other new defined message, which satisfies a function that the source AN requests the target AN to assist in paging the MS/AT and the A13 paging response message can also be a corresponding new defined message.

Preferably, in the step b, the A13-paging request message comprises related session information of HRPD terminals necessary for the target AN, and also comprises time information about the source AN sending paging.

Preferably, the target AN is one or more ANs of HRPD.

According to another aspect of the present invention, provides a method for rejecting a 1× paging transferred in HRPD, when IWS is in 1× BS, comprises the following steps:

A, MSC sends a paging request message to IWS-1× BS;

B, IWS-1× BS sends an A21 interface air interface signaling message to a source AN;

C, the source AN sends an A13-paging request message to a target AN and receives an A13-paging response request message returned by the target AN;

D, the source AN and the target AN send 1× paging messages to MS/AT respectively;

E, the MS/AT sends a 1× paging acknowledgment message to the target AN, then the target AN sends an A13 paging delivered message to the source AN and receives an acknowledgment message returned by the source AN;

F, the source AN sends an A21 interface acknowledgment message to IWS-1× BS;

G, the MS/AT decides to reject the 1× service paging message. MS/AT sends CSNA (circuit service notification application) message with a 1× release order packaged in to the target AN, and the target AN sends an A13-1× air interface signaling message with the 1× release order to the source AN and receives an acknowledgment message returned by the source AN;

H, the source AN sends an A21 air interface signaling message including a 1× release order to a 1× BS and receives an acknowledgment message returned by the 1× BS, then IWS-1× BS sends a rejection message to MSC, indicating the 1× service is rejected.

Preferably, the step D also comprises: if the paging message of the source AN reaches the MS/AT, the MS/AT sends a paging acknowledgment message to the source AN and turns to the step F.

Preferably, the step F also comprises: if the paging message of the source AN in the above step D reaches the MS/AT, the MS/AT sends CSNA message with a 1× release order message packaged in to the source AN and turns to the step H.

Preferably, the step F also comprises: if the source AN fails to detect the MS/AT or receive any A13 paging delivered messages from the target AN, a cause value "Unknown MS/AT" is included in an A21 interface acknowledgment message and the flow is finished.

Preferably, the A13-paging request message in the step C can also be other new defined message, which satisfies a function that the source AN requests the target AN to assist in paging the MS/AT and the A13 paging response message can also be a corresponding new defined message.

Preferably, the A13-paging request message in the step C comprises related session information of HRPD terminals necessary for the target AN and also comprises time information of the source AN sending paging.

Preferably, the A13-1× air interface signaling message in the step G can also be other new defined message satisfying a function that the target AN forwards a order or message defined by corresponding 1× air interface to the source AN, and the A13-1× air interface signaling acknowledgment message can also be a corresponding new defined message.

Preferably, the target AN is one or more ANs of High Speed Packet Data system.

At least one the following advantageous effects can be achieved with the present invention:

By adopting the method in the present invention, the opportunity is increased for MS/AT on the multiple edges of AN to receive services from 1× network and control channels paging through the HRPD air interface, which guarantees services from 1× network can be exactly transferred to MS/AT of HRPD system in time, and improves the paging process of rejecting 1× services by HRPD system's users in the prior art and enhances the ability of dual network operation.

Figure 1:
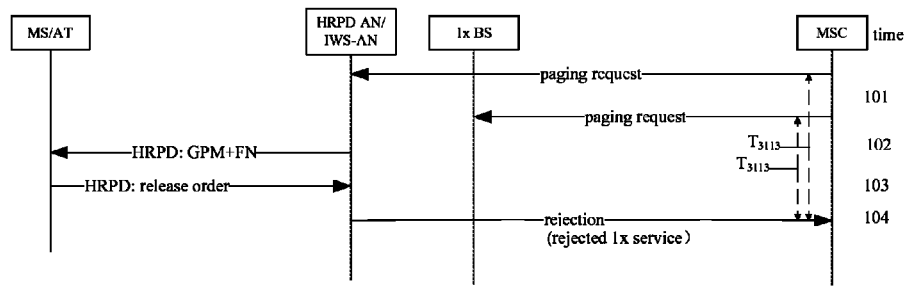
FIG. 1 is a flow chart showing the method of rejecting a 1× paging transferred in HRPD network in the prior art, when SC/MM is in AN and IWS is in AN.

The abbreviations and English terms appearing in the figures are explained as follows:

(1) HRPD: High Speed packet data;

(2) 1×: also called 3G 1× or cdma2000 1× expressing cdma2000 single carrier network;

(3) MS/AT: dual mode terminal, able to work in HRPD network and 3G 1× network;

Generally, MS (Mobile Station) is referred to as the terminal in the 3G 1× network, while AT (Access Terminal) as that in the HRPD network;

(4) HRPD AN: AN (Access Network) of HRPD system, a logic entity integrated in radio access network for radio communication with an access terminal;

(5) PCF: Packet Control Function;

(6) 1× BS: base station of 3G 1× network;

(7) MSC: switch of 3G 1× network;

(8) IWS: Interworking solutions;

(9) IWS-BS: IWS in BS;

(10) Secondary Color Code;

(11) A21: A21 interface, an interface between AN of HRPD and 1× BS;

(12) A13: A13 interface, an interface between ANs of HRPD;

(13) Paging Request: Paging Request message

(14) GPM: General Paging Message;

(15) FN: Feature Notification;

(16) Page response message;

(17) Complete L3 Info: Complete Layer 3 Information;

(18) Event Notification: Event Notification message;

(19) Event Notification Ack: Event Notification Acknowledgment message;

(20) A13-1× Air Interface Signaling: A13-1× Air Interface Signaling message;
(21) A13-1× Air Interface Signaling Ack: A13-1× Air Interface Signaling Acknowledgment message;
(22) A21-1× Air Interface Signaling: A21-1× Air Interface Signaling message;
(23) A21-Ack: A21 interface Acknowledgment message;
(24) 3G1× Service Packet;
(25) 3G1× Service Ack: 3G1× Service Packet Acknowledgment;
(26) A13-Paging Request: A13-Paging Request message;
(27) A13-Paging Response: A13-Paging Response message;
(28) A13-Paging Delivered: A13-Paging Delivered message;
(29) A13-Paging Delivered Ack: A13-Paging Delivered Acknowledgment message;
(30) A21-Event Notification: A21 Interface Event Notification message;
(31) A21-Event Notification Ack: A21 Interface Event Notification Acknowledgment message;
(32) T3113, Tevent, Tack-21, Tpreq-13: corresponding timers.

DETAILED DESCRIPTION OF THE PREFERRED EMBODIMENTS

The present invention will be further described in details in combination with the accompanying drawings and preferred embodiments as follows. If not conflict, the embodiments and the technical features of the embodiments can be combined together.

In the present invention, the Secondary Color Code mechanism is applied in HRPD network to transfer voice paging services from 1×, so that AN registered by MS/AT sends A13-Paging Request messages to other adjacent ANs, a cell phone is paged together through these ANs and some new messages are added to improve the rejection process.

Suppose the AN registered by MS/AT in the HRPD system, updated for registration in MSC and connected with MSC is a source AN, and other AN on the edge of the source AN is target AN.

When IWS is in AN, following steps are included:

a, MSC of a 1× network sends paging request messages to AN of HRPD, i.e. the source AN, and one or more 1× BSs reachable for MS/AT in its paging area;

b, the source AN sends an A13-paging request message to a target AN and receives an A13-paging response message returned by the target AN;

c, the source AN and the target AN sends general paging messages to MS/AT respectively;

d, MS/AT sends a release order to the target AN, then the target AN transfers the message to the source AN via an A13 air interface signaling message and receives an acknowledgment message returned by the source AN;

e, the source AN sends a rejection message to MSC, indicating the 1× service is rejected.

Figure 3:
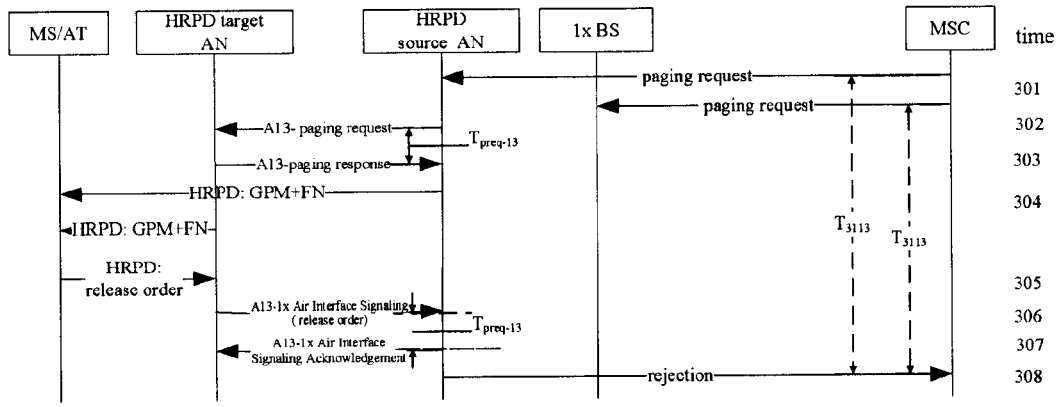
FIG. 3 is a flow chart showing the method of rejecting a 1× paging transferred in HRPD based on the support of Secondary Color Code, when SC/MM is in AN and IWS in AN.

FIG. 3 describes the detailed signaling process of the method, when IWS is in AN, comprising the following steps:

301, detecting a voice call of MS/AT in MSC's service area, MSC sends paging request messages to a source AN of HRPD and one or more 1× BSs reachable for MS/AT in its paging area. MSC starts a timer T3113 for each paging request message. MSC can comprise caller information. Wherein, a paging request message can include a Virtual Paging Indication (VPI), indicating 1× BS should prepare to receive a paging response message from MS/AT.

302, the source AN decides to page MS/AT by the RT (Radio Transceiver) itself or with some RTs of a target AN, sends an A13-paging request message to the target AN and starts a timer Tpreq-13.

The A13-paging request message comprises related session information of AT necessary for determining paging areas etc. by the target AN and can also comprise the time information of the source AN sending paging. If the target AN can send paging in the same time slot, the opportunity that AT misses the paging will be reduced. Wherein, the target AN can be multiple, however, only one is shown in the present embodiment.

303, the target AN sends an A13-paging response message to the source AN. After receiving the message, the source AN stops the corresponding timer Tpreq-13.

Wherein, the A13-paging request message can also be other new defined message, which satisfies the function of the source access network's requesting the target access network to assist in paging a dual mode terminal. At the moment, the A13 paging response message is a corresponding new defined message.

304, the source AN and the target AN send general paging messages (GPM) on their air interface control channels. If the caller information is included in MSC in step 301, the caller information contained together in FN (Feature Notification) message is to sent to MS/AT.

The target AN is supposed to receive an acknowledgement from MS/AT in the present process. If the source AN receives the acknowledgement message from MS/AT, the subsequent processes are the same as those of the prior art as shown in FIG. 1.

305, MS/AT decides to reject the 1× service and sends a release order to the target AN.

306, the target AN transfers the release order message to the source AN via an A13-1× air interface signaling message and then starts the timer Tpreq-13.

307, the source AN sends an A13-1× air interface signaling acknowledgement message to the target AN. After receiving the message, the target AN stops the timer Tpreq-13.

Wherein, the A13-1× air interface signaling message can also be other new defined message satisfying the function that the target AN forwards the order or message (such as the release order in the present embodiment) defined by the corresponding 1× air interface to the source AN. At the moment, the A13-1× air interface signaling acknowledgment message is the corresponding new defined message.

308, the source AN sends a rejection message to MSC, indicating the 1× service is rejected. MSC stops all timers T3113 for the MS/AT.

When IWS is in 1× BS, the following steps are included:

A, MSC sends a paging request message to IWS-1× BS;

B, IWS-1× BS sends an A21 interface air interface signaling message to source AN;

C, the source AN sends an A13-paging request message to target AN and receives an A13-paging response request message returned by the target AN;

D, the source AN and the target AN send 1× paging messages to MS/AT respectively;

E, MS/AT sends a 1× paging acknowledgment message to the target AN, then the target AN sends an A13 paging delivered message to the source AN and receives an acknowledgment message returned by the source AN;

F, the source AN sends an A21-interface acknowledgment message to IWS-1× BS;

G, MS/AT decides to reject the 1× service paging and sends CSNA message with a 1× Release Order packaged in it to the target AN. The target AN sends an A13-1× air interface signaling message with the 1× release order message to the source AN and receives an acknowledgment message returned by the source AN;

H, the source AN sends an A21 air interface signaling message with the 1× release order to IWS-1× BS and receives an acknowledgment message returned by IWS-1× BS. IWS-1× BS then sends a rejection message to MSC, indicating the 1× service is rejected.

Figure 4:
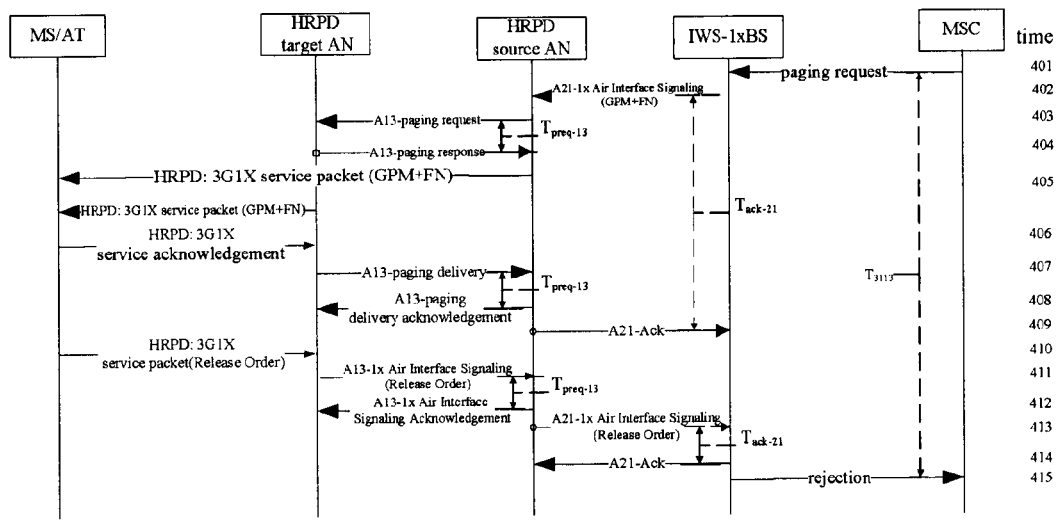
FIG. 4 is a flow chart showing the method of rejecting a 1× paging transferred in HRPD based on the support of Secondary Color Code, when SC/MM is in AN and IWS in 1× BS.

FIG. 4 describes the detailed signaling process of the method when IWS is in 1× BS, comprising the following steps:

401, MSC detects a call terminated by MS/AT in its service area, sends a paging request message to 1× IWS-BS and starts a timer T3113. MSC can include caller information.

402, IWS-1× BS sends an A21-1× Air Interface Signaling message including a 1× paging message to source AN of HRPD and starts a timer Tack-21. Before requiring HRPD to page MS/AT, IWS-1× BS guarantees resources supporting the 1× service available. If the caller information is included in step 401, 1×-BS sends FN message together with the caller information included to the source AN.

403, the source AN decides to page MS/AT by the RT itself or together with some RTs of the target AN, sends an A13-paging request message to the target AN and starts a timer Tpreq-13.

The A13-paging request message comprises related session information of AT necessary for determining paging areas etc. by the target AN, and can also comprise the time information of the source AN sending paging. If the source AN has caller information, the A13-paging request message can also include caller information.

If the target AN can send paging in the same time slot, the opportunity that AT misses the paging will be reduced. Wherein, the target AN can be multiple, however, only one is shown in the present embodiment.

404, the target AN sends an A13-paging response message to the source AN, who stops the corresponding timer Tpreq-13 after receiving the message.

Wherein, the A13-paging request message can also be other new defined message, which satisfies the function that the source access network requests the target access network to assist in paging a dual mode terminal. At this time, the A13 paging response message is a corresponding new defined message.

Figure 2:
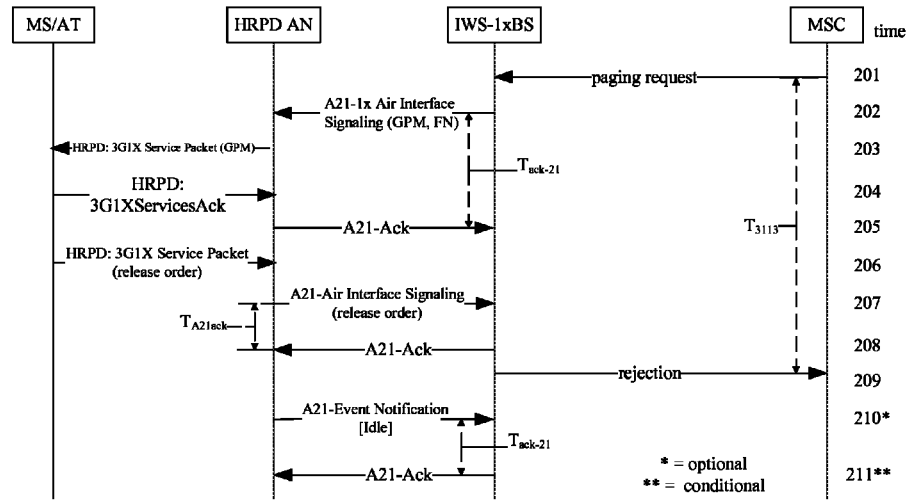
FIG. 2 is a flow chart showing the method of rejecting a 1× paging transferred in the HRPD network in the prior art, when SC/MM is in AN and IWS in 1× BS.

405, the target AN and the source AN of HRPD send 1× paging messages to MS/AT respectively. The target AN is supposed to receive an acknowledgement from MS/AT in the present process. If the source AN receives the acknowledgement message from MS/AT, the subsequent processes are the same as those in the prior art as shown in FIG. 2.

406, MS/AT confirms receipt of the 1× paging message to the target AN.

407, the target AN sends an A13-paging delivered message to the source AN, indicating MS/AT has received the paging message and starts the timer Tpreq-13.

408, the source AN sends an A13-paging delivered acknowledgement (A13-Paging Delivered Ack) message to the source AN to respond the A13-paging delivered message and stops the timer Tpreq-13.

409, the source AN of HRPD sends an A21-Ack message to IWS-1× BS to confirm receipt of the A21 message. IWS-1× BS stops the timer Tack-21. If HRPD AN fails to detect AT/MS or receive any A13-paging delivered acknowledgment messages from the target AN, the cause value "Unknown MS/AT" is included in the A21-Ack message and the flow is finished.

410, MS/AT sends CSNA with the 1× release order message packaged in to the target AN to reject the 1× service paging.

411, the target AN sends an A13-1× air interface signaling message, forwards the 1× release order message to the source AN and starts the timer Tpreq-13.

412, the source AN sends an A13-1× air interface signaling acknowledgement message and stops the timer Tpreq-13.

413, the source AN forwards the A21-1× air interface signaling message with the 1× release order message included to IWS-1× BS and starts the timer Tack-21.

414, 1× BS sends an A21-Ack message to the source AN to confirm receipt of the A21 message. After receiving the message, the source AN stops the timer Tack-21.

415, 1× BS sends a rejection message to 1× MSC, indicating the 1× service is rejected.

The present invention has been shown with reference to the above-described embodiments, and it is not to be limited by the above embodiments. It is understood by those skilled in the art various alterations and changes may be made within the spirit and scope of the invention. All modifications, substitute equivalents or improvements made therein are intended to be embraced in Claims of this invention.

What is claimed is:

1. A method for Refusal of a 1× Page Delivery to the MS/AT in an HRPD System, wherein, when Interworking Solution is carried out in a 1× Base Station, the method comprises the following:

A, sending a paging request message to the 1× Base Station where the Interworking Solution is used, by means of a switch;

B, sending an A21-1× air interface signaling message to a source Access Network by means of the 1× Base Station;

C, sending an A13-paging request message to a target Access Network and receiving an A13-paging response message returned by the target Access Network, by means of the source Access Network;

D, sending 1× paging messages to a dual mode terminal respectively by means of the source Access Network and the target Access Network;

E, sending a 1× paging acknowledgment message to the target Access Network by means of the dual mode terminal, then sending an A13 paging delivered message to the source Access Network and receiving an acknowledgment message returned by the source Access Network, by means of the target Access Network;

F, sending an A21-interface acknowledgment message to the 1× Base Station where Interworking Solution is used, by means of the source Access Network;

G, sending a circuit domain service notification application protocol message with a 1× release order packaged in to the target Access Network when it is decide to reject the 1× service paging message, by means of the dual mode terminal, and sending an A13-1× air interface signaling message with the 1× release order to the source Access Network and receiving an acknowledgment message returned by the source Access Network, by means of the target Access Network;

H, sending a 1× release order to the 1× Base Station and receiving an acknowledgment message returned by the 1× Base Station, by means of the source Access Network; then sending a rejection message to the switch to indicate that the 1× service is rejected, by means of the 1× Base Station;

wherein, D further comprises: if the paging message of the source Access Network reaches the dual mode terminal, then sending a paging acknowledgment message to the source Access Network by means of the dual mode terminal and turning to F.

2. The method for rejecting a 1× paging transferred in High Rate Packet Data network according to claim 1, wherein, F also comprises: if the paging message of the source Access Network in D reaches the dual mode terminal, the dual mode terminal sends a circuit service notification application protocol message with a 1× release order message packaged in to the source Access Network and turns to H.

3. The method according to claim 1, wherein, F further comprises: if the source Access Network fails to detect the dual mode terminal or fails to receive any A13-paging delivered messages from the target Access Network, a cause value "Unknown MS/AT" is included in a A21 interface acknowledgment message and the flow is finished.

4. The method according to claim 1, wherein, the A13-paging request message in C is a new defined message, which satisfies the function that the source Access Network requests the target Access Network to assist in paging the dual mode terminal, and the A13-paging response message is a corresponding new defined message.

5. The method according to claim 1, wherein, the A13-paging request message in C comprises related session information of High Speed Packet Data terminals necessary for the target Access Network.

6. The method according to claim 5, wherein, the A13-paging request message in C also comprises time information of paging sending by means of the source Access Network.

7. The method according to claim 1, wherein, the A13-1× air interface signaling message in G is a new defined message satisfying the function that the target Access Network forwards an order or message defined by corresponding 1× air interface to the source Access Network, and the A13-1× air interface signaling acknowledgment message is a corresponding new defined message.

8. The method according to any one of claims 1 and 2 to 7, wherein, the target Access Network is one or more Access Networks of High Speed Packet Data system.

* * * * *